United States Patent
Kumar et al.

(10) Patent No.: US 12,073,345 B2
(45) Date of Patent: Aug. 27, 2024

(54) METHOD, SYSTEM, AND PLATFORM FOR DYNAMIC BILL-OF-MATERIALS GENERATION

(71) Applicant: Sanveo, Inc., Newark, CA (US)

(72) Inventors: Abhishek Kumar, Newark, CA (US); Rehan Amin, Orlando, FL (US); Sethu Madhavan Anilkumar, Santa Clara, CA (US); Chaitanya Bharech, New Delhi (IN)

(73) Assignee: AECInspire, Inc., Newark, CA (US)

( * ) Notice: Subject to any disclaimer, the term of this patent is extended or adjusted under 35 U.S.C. 154(b) by 0 days.

(21) Appl. No.: 17/444,190

(22) Filed: Aug. 1, 2021

(65) Prior Publication Data

US 2023/0034172 A1    Feb. 2, 2023

(51) Int. Cl.
*G06Q 10/0875* (2023.01)
*G06F 16/28* (2019.01)
*G06Q 10/0631* (2023.01)

(52) U.S. Cl.
CPC ..... *G06Q 10/06313* (2013.01); *G06F 16/284* (2019.01); *G06Q 10/0875* (2013.01)

(58) Field of Classification Search
CPC ............. G06Q 50/08; G06Q 10/0875; G06Q 10/06313; G06F 30/18; G06F 30/13
See application file for complete search history.

(56) References Cited

U.S. PATENT DOCUMENTS

| 2009/0216583 A1* | 8/2009 | Degbotse | ......... G06Q 10/06312 705/7.22 |
| 2012/0109350 A1* | 5/2012 | Buchowski | ............. G06F 30/00 700/98 |

(Continued)

FOREIGN PATENT DOCUMENTS

WO    WO-2015040947 A1 *    3/2015    ............. G06F 17/50

OTHER PUBLICATIONS

Sanveo Announces Launch of Cloud-Based Procurement Platform—AECInspire. posted by wchoueiki. Oct. 21, 2019 (Year: 2019).*

(Continued)

*Primary Examiner* — Johnna R Loftis
(74) *Attorney, Agent, or Firm* — Qadeer LLC

(57) ABSTRACT

The present disclosure relates to methods and systems for improvements in generating a bill of materials and a schedule. In some embodiments, a system is disclosed that has one or more processors and one or more non-transitory computer-readable memories coupled to the one or more processors and configured with instructions executable by the one or more processors that may cause the system to perform operations that include receiving a file, folder, or package, generating one or more virtual 2D or 3D models and a relational database based thereon, generating one or more specification scopeboxes defined by spaces within the models, determining placement of assemblies within spaces defined by specification scopeboxes to associate assemblies with specification scopeboxes, determining the interconnection of assemblies, generating a quantity scopebox containing materials necessary for the placement of the assemblies and their interconnections, and generating a schedule for the ordering or placement of the materials.

20 Claims, 11 Drawing Sheets

(56) References Cited

U.S. PATENT DOCUMENTS

| | | | |
|---|---|---|---|
| 2012/0221986 A1* | 8/2012 | Whitford | G06F 30/13 |
| | | | 716/100 |
| 2016/0004791 A1* | 1/2016 | Hollmann | G06F 30/00 |
| | | | 700/98 |
| 2020/0134745 A1* | 4/2020 | McLinden | G06Q 10/06313 |
| 2020/0410449 A1* | 12/2020 | Blackburn | G06Q 50/08 |

OTHER PUBLICATIONS

Romeo, Jim. Putting Software to Work for You. Nov. 15, 2019 (Year: 2019).*

* cited by examiner

METHOD, SYSTEM, AND PLATFORM FOR DYNAMIC BILL-OF-MATERIALS GENERATION

BACKGROUND

Field of the Invention

The present disclosure relates to dynamic bill-of-materials generation from architectural models and drawings.

Description of the Related Art

When mechanical, electrical, plumbing, architectural, or other similar drawings or models are finalized, this information must be converted into a bill-of-materials to enable construction. Typically, this requires that a person review the drawings or models and determine for various areas in the drawings or models the necessary items, such as structural, electrical, and lighting components, that are necessary to implement in the design or construction phase.

SUMMARY

The present disclosure is related to effective, efficient, and economical methods and systems for improvements in generating a bill of materials and a schedule. According to some embodiments, a system is disclosed herein that comprises one or more processors and one or more non-transitory computer-readable memories coupled to the one or more processors and configured with instructions executable by the one or more processors that may cause the system to perform operations comprising: receiving a file, folder, or package; generating one or more virtual 2D or 3D models and a relational database based on the file, folder, or package; generating one or more specification scopeboxes, wherein the specification scopeboxes are defined by spaces within the virtual one or more 2D or 3D models; determining placement of assemblies, wherein the placement of an assembly within a space defined by any specification scopeboxes results in the assembly being associated with such specification scopeboxes; determining the interconnection of assemblies; generating a quantity scopebox containing the materials necessary for the placement of the assemblies and their interconnections; and generating a schedule for the ordering or placement of the materials.

DETAILED DESCRIPTION OF ILLUSTRATED EMBODIMENTS

Figure 1:
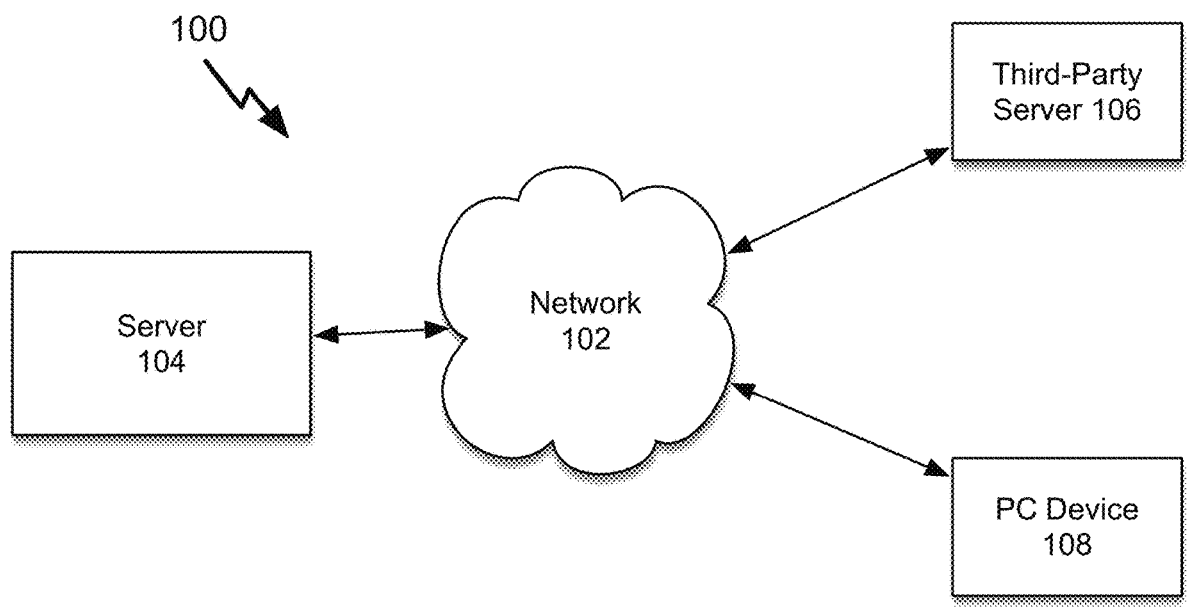
FIG. 1 illustrates an example of a system for BOM Generation.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, cloud storage, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disc (CD) or digital versatile disc (DVD), flash memory, memory, or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware, or microcode, the program code or code segments to perform the necessary tasks (e.g., a computer-program product) may be stored in a machine-readable medium. A processor(s) may perform the necessary tasks.

With respect to FIG. 1, an example of a System 100 for Bill of Material ("BOM") generation is shown. Network 102 may be any network or network of networks suitable for interconnecting computing devices for electronic communication. It may be comprised of wired networks, wireless networks, or a combination thereof. Server 104 may be a server for hosting the BOM generation platform. Such a server may consistent of a single server, distributed servers, a cloud platform, or other methods known in the art for hosting server-based software platforms. Third-Party Server 106 may be comprised of third party servers that interact with Server 104 via Network 102. For example, Third-Party Server 106 may consist of a server platform provided by third-party companies. PC 108 may be any computing device capable of connecting to server 104 via Network 102. PC 108 may use an application, a web browser client, or other software methods to interact with Server 104.

Figure 2:
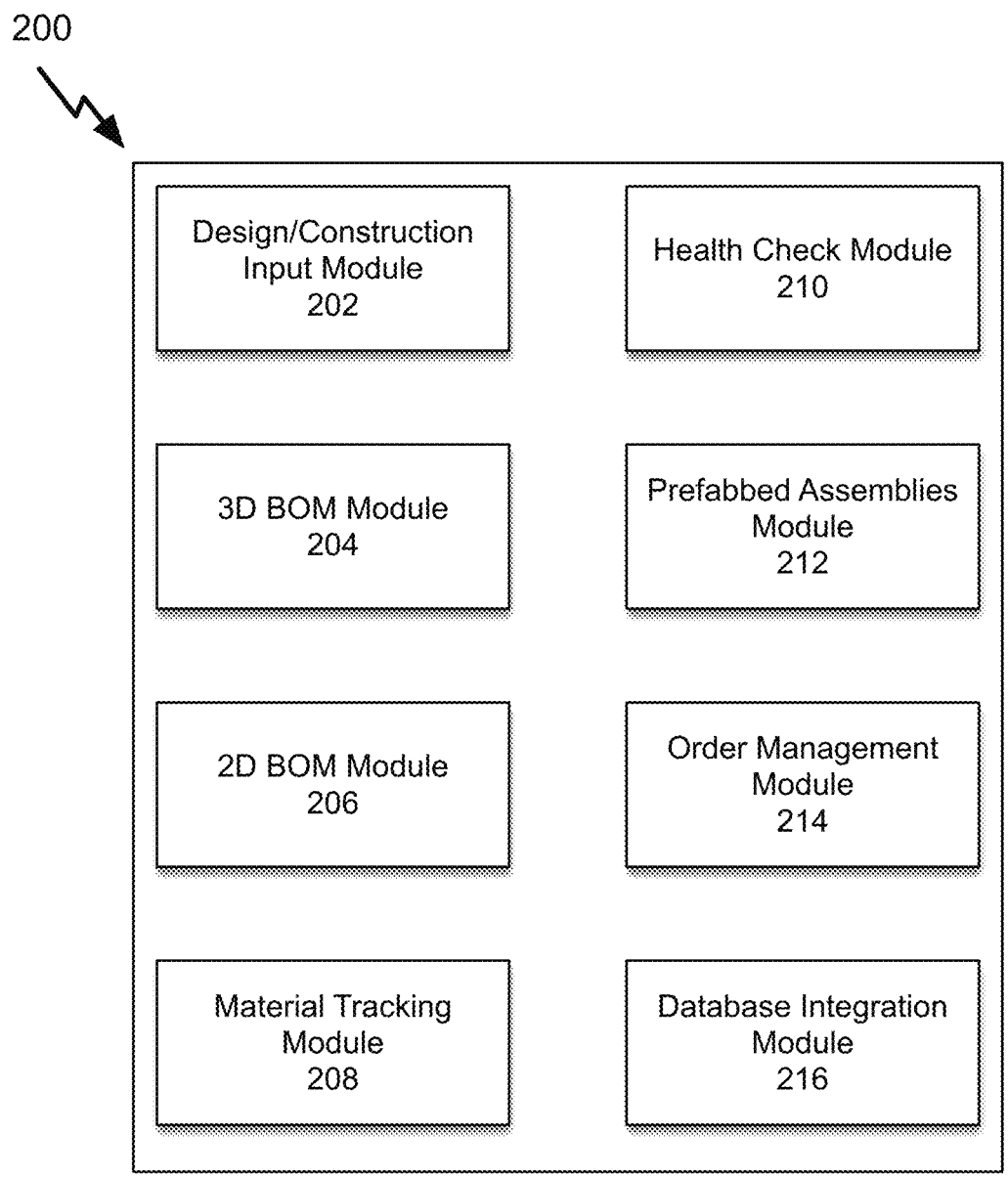
FIG. 2 illustrates another example of a system for BOM Generation.

With respect to FIG. 2, an example of a System 200 for BOM generation is shown. Design/Construction Input Module 202 may comprise a component for receiving and storing architectural information from a user. For example, Design/Construction Input Module 202 may receive drawings, building information models ("BIMs"), or other files containing digital representations of physical and functional characteristics of places, buildings, or other structures. 3D BOM Module 204 may comprise software performing a set of methods described herein for BOM generation in three-dimensional spaces. 2D BOM 206 module may comprise software performing a set of methods as described herein for BOM generation in two-dimensional spaces. Material Tracking Module 208 may comprise a software component for tracking the quantity and location of materials at various construction stages or locations, such as at a job site, in transit, at a manufacturer, and so on. In addition, Material Tracking Module 208 may also track the progress of fabrication of materials. For example, Material Tracking Module 208 may make a request to a Third-Party Server 106 for updates on the construction of a material being fabricated by a manufacturer. Such updates may include information about progress toward completion, milestones achieved, delays holding up completion, testing, defects encountered or corrected, and so on.

Health Check Module 210 may comprise a software component that performs methods as described herein to insure the integrity of information provided by users or its compliance with various conditions. In addition, Health Check Module 210 may also perform methods described herein to insure the integrity of functions performed by other modules of System 200.

For example, the Health Check Module may check for conduit runs that do not terminate at a junction, junctions not connected to conduit, whether the layout violates design constraints (e.g., no looping of electrical conduit runs), etc. In addition, the Health Check Module may perform simulations to determine energy efficiency, air quality, and other environmental measurements. The Health Check Module may also determine if layouts meet buildings codes and provide information on potential corrections where deficiencies are detected. A user may then correct or the deficiency or instruct the Health Check Module to ignore it.

In some embodiments, the Health Check Module may also track pricing information of materials and recommend possible substitutions that may give a substantial cost savings. This process may be triggered by the user, such as when finalizing a design, or automatically by the system when it receives changes in pricing information.

Prefabbed Assemblies Module 212 may comprise a software component that performs methods of receiving, generating, or storing prefabricated assemblies that represent structural, electrical, mechanical, and other prefabricated assemblies. For example, a hotel often has a limited number of designs for rooms that are repeated throughout the building. Accordingly, Prefabbed Assemblies Module 212 may receive, generate, or store prefabricated assemblies for the layout of plumbing, lighting, electrical, and so on with respect to each unique room layout. In addition, this may include other elements, such as furniture and its positioning. As used herein, prefabricated assemblies may refer to designs that are preferably repeated throughout a structure, regardless of where the actual fabrication of the assemblies will physically take place.

Order Management Module 214 may comprise a software component that performs methods of placing orders from a BOM, tracking the progress of orders from a BOM (e.g., milestone achievements, time to completion), and tracking the delivery of orders from a BOM.

Database Integration Module 216 may comprise a software component for managing the storage of data with respect to methods described herein. Database Integration Module 216 may also be used to connect to enterprise resource planning system of third-party suppliers, manufacturers, and distributors.

Figure 3:
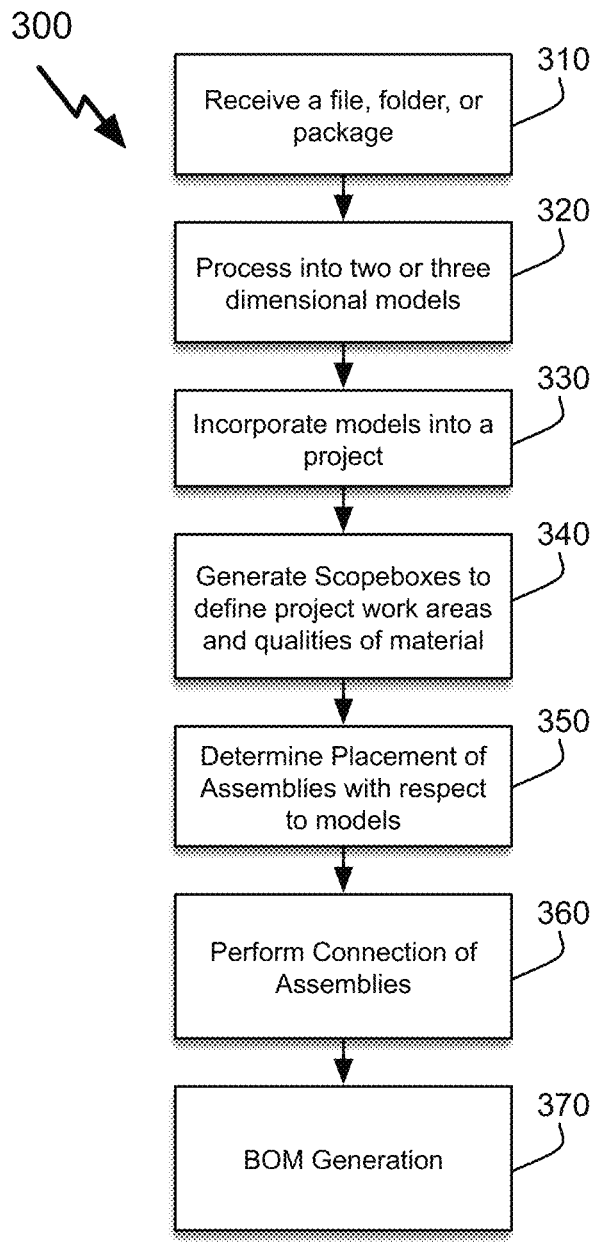
FIG. 3 illustrates an example of a method for BOM Generation.

With respect to FIG. 3, a method 300 for BOM generation is shown. At step 310, a file, folder, or package may be received containing digital representations of physical and functional characteristics of places, buildings, or other structures. For example, such representations may be scanned images, PDFs, BIMs, drawings, 2D or 3D models, and may include additional information such as metadata.

At step 320, processing of the file, folder, or package may be processed into a relational database for use with the systems described herein. For example, scanned drawings may be converted to vector-based models or other models known in the art. In some embodiments, once models are generated, the system may also generate additional drawings (e.g., 2D or 3D) or other models such as for use with augmented reality representation. Moreover, the drawings or models generated may then be associated with Scopeboxes described below as they are generated, such that if a user selects an item on a model or drawing, the appropriate one or more Scopeboxes associated with the item may be presented to the user. In addition, selection of an item in one model or drawing may result in the selection of that item in other models or drawings being displayed to the user.

Figure 6:
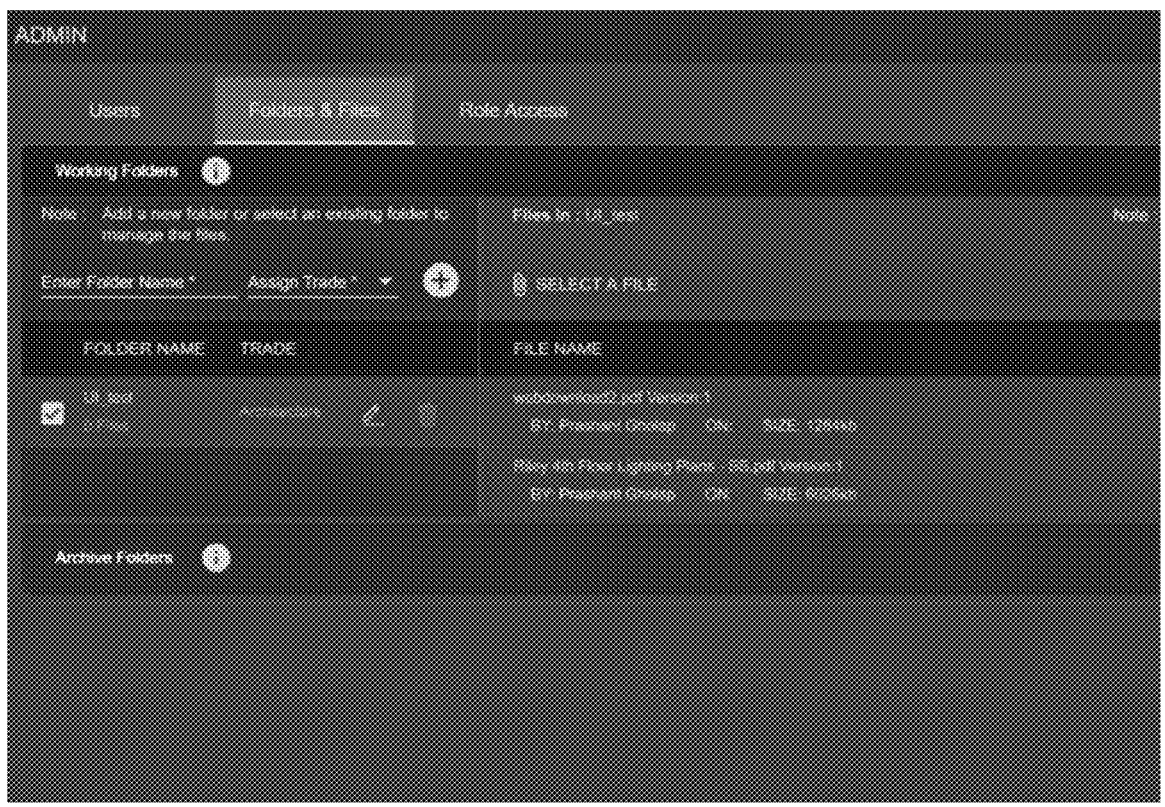
FIG. 6 illustrates an example of a project package.

At step 330, a project package, such as a file or a folder, may be generated or modified to include the file, folder, or package received at step 310, the two or three-dimensional model generated at step 320, and any relevant data or information added or created with respect to materials stored in the project package. For example, with respect to the project package the files may be assigned to one or more users, one or more projects, placed in one or more working folders, assigned one or more role access designations (e.g., architect, supervisor, contractor), or assigned one or more trade settings as described herein. If the project package is assigned a title block name, individual sheets of drawings or aspects of models within the files may be automatically renamed based on the title block name. In addition, changes to files or sheets may be tracked by database versioning. An example of project package with versioning information is shown in FIG. 6.

With respect to a project package, various trade settings may also be set as part of step 330. For example, a default scale for sheets or models may be selected and individual scale may set for each sheet or model in the project package. Various components represented in the sheets or models of the project package may also be designed as assemblies. For example, light fixtures, electrical circuit boxes, sprinklers, doors, cabinets, and other components may be represented as assemblies. Further, such assemblies may themselves be grouped into additional assemblies. For example, sprinkler heads and pipes connecting them may be designed as individual assemblies separately and as a combined assembly.

Each assembly may be designated with one or more tags. For example, an electrical panel assembly may have multiple tags (e.g., Phase, Wall Type, Panel, Circuit Number, Height, Whip). Each assembly or group of assemblies added to a project package may also automatically prompt a user to provide panel settings related to each assembly or group of assemblies, such as a name and characteristics describing the designation, form or function of each assembly (e.g., panel name, circuit breaker, 277/480 Voltage). In addition, each assembly or group of assemblies added to a project package may also automatically prompt a user to provide layer settings related to each assembly or group of assemblies, such as layer names name, abbreviations associated with layer names, and colors associated with layer names. For example, a set of layer names, abbreviations, and colors may be assigned as Communication (Comm., Red), Data (Data, Maroon), Fire Alarm (Fire, Black), Lighting (Light, Green), Mechanical, (Mech, Orange), Nurse Call (Nurse, Teal), Power (Pwr, Purple), Security (Sec, Brown), and Telephone (Tele, Blue). Further, if a default set of layer names, abbreviations, and colors is provided, the system may allow a user to add, delete, or modify layer names, abbreviations, and colors or prohibit such actions based on user settings.

At step 340, one or more Scopeboxes may be generated according to systems and methods described herein. A Scopebox may be used to serve a variety of different functions. For example, a Scopebox may be used to define an area or volume within the project package, a grouping of items within the project package, or a pre-fabricated packaging. Such Scopeboxes may be embedded within each other. Also, Scopeboxes may be edited or locked based on user permissions.

In some embodiments, Scopeboxes may be automatically generated or modified, such as where adjustments to a Schedule or Bill of Materials occurs necessitating changes. For example, if a light fixture is unavailable and a replacement is selected from within the BOM, such a replacement may require changing any Scopeboxes associated with the light fixture for Scopeboxes associated with the replacement. In some instances, differences between the original item and the replacement may require additional information to be added by default.

Alternatively, in some embodiments, a user may be prompted to provide the additional information required.

In various embodiments, Scopeboxes may also be defined by a user relative to a 2D or 3D representation of a physical structure. For example, a building may be shown and the user may select a basement area by defining the boundaries of the basement, such as by inputting a list of coordinates forming a defined volume or using a selection tool that draws a volumetric area (and which may allow for volumetric additions or deletions) based on pre-defined shapes (e.g., rectangular, circular, ellipsoidal). In this manner, Scopeboxes may be automatically generated or modified to include all the elements within the volumetric area defined by the user.

As another example, a Schedule may be associated with the project package that indicates the receiving order of arrival of assemblies or items (e.g., from a manufacturer), the storage location for such items (e.g., which floor or room), or the installation order for such items (e.g., light fixtures stored in "room 1" should be installed in "room 2"). If changes occur to the schedule, this may also propagate changes among the Scopeboxes. For example, if a schedule is adjusted because of a delay in the receipt of assemblies or items, Scopeboxes may be generated or modified to accommodate the changes in the schedule. For example, Scopeboxes may be modified to indicate the relocation of assemblies or items to serve work occurring earlier in the schedule. As another example, assemblies or items may be reassigned functionally from one Scopebox to another for the same reason, such as a specific light fixture being assigned to a different assembly of fixtures and conduit. Alternatively, in some embodiments, a user may be prompted to provide any additional information or modifications required.

As an example of the modification of the schedule, shipments of materials may be received at a central receiving area. Once the shipments are scanned into the system, such as by labels with QR codes, the system may also receive location data and a timestamp. Based on progress within the Schedule, the system may instruct that materials be moved to a secondary receiving area near a worksite, a storage area, or a worksite. The Schedule may also include information about resources available for the movement or installation of items. For example, devices such as cranes or elevators and their lifting capacity may be provided to the system, such that if the weight of size of materials is also included the Schedule can determine an optimum number or type of materials to be transports from one location to another. In this manner, the Schedule's algorithms may reduce the impact of potential bottlenecks in the relocation of materials.

In addition, information regarding labor resources (e.g., the number of workers available for various tasks) may also be provided to the system, such that it may determine the placement of materials best suited for those labor resources. For example, if economic conditions necessitate an increase or decrease in available labor, the system can automatically adjust the relocation of materials based on historical data regarding the installation of such materials. In some embodiments, the Schedule may also use historical data regarding the installation of such materials to provide productivity metrics of individual laborers or groups of laborers.

Figure 7:
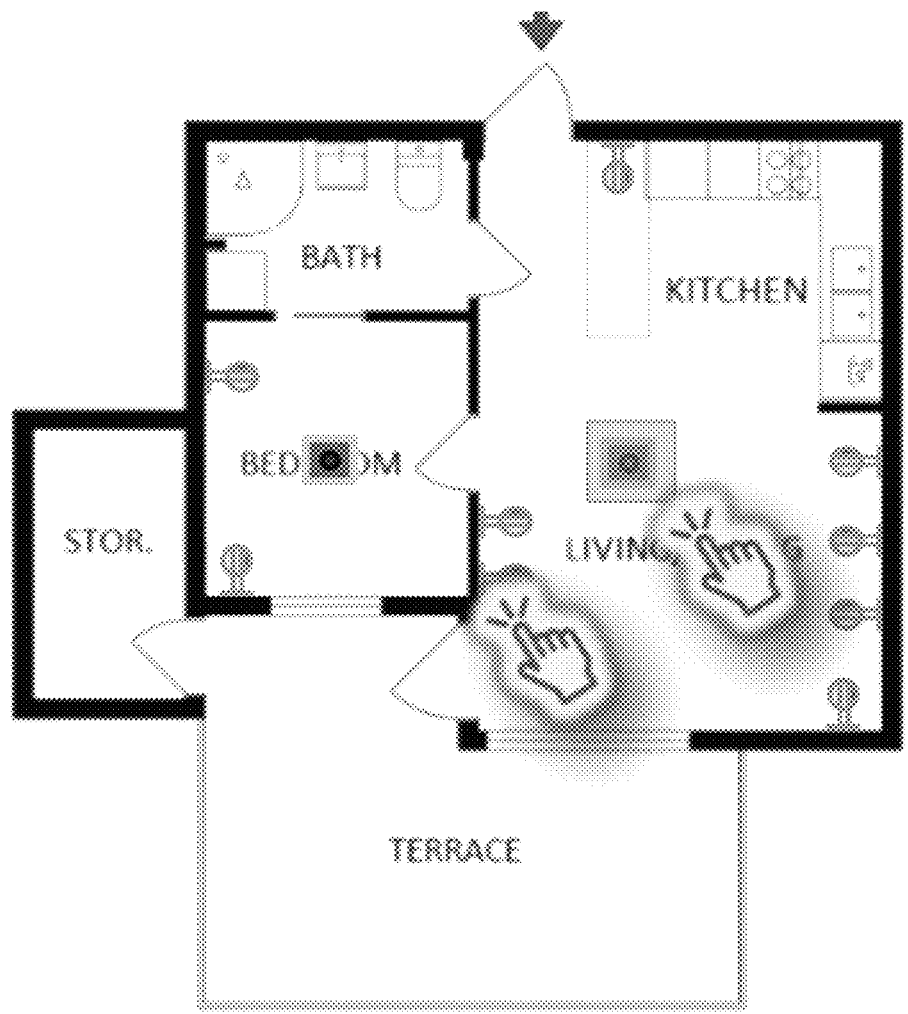
FIG. 7 illustrates an example of placing an assembly.
Figure 8:
FIG. 8 illustrates an example of placing a scopebox.

At step 350, placement of assemblies may occur. For example, a symbol or assembly library may be presented showing a number of different assemblies (e.g., lighting fixtures, ceiling devices, in-wall devices), each of which may be represented by one or more Scopeboxes. For example, a user may select an assembly such as a power receptacle and place this on or within a drawing or model of the project package as shown in FIG. 7. Further, a user may then edit a Scopebox for such an assembly. For example, the Scopebox for a power receptacle may specify the name, position, and layer assigned to the assembly, while allowing the user to edit other parameters such as its height, work package, level, and area assignments as well as circuit number, panel ID, and Phase as shown in FIG. 8.

Figure 9:
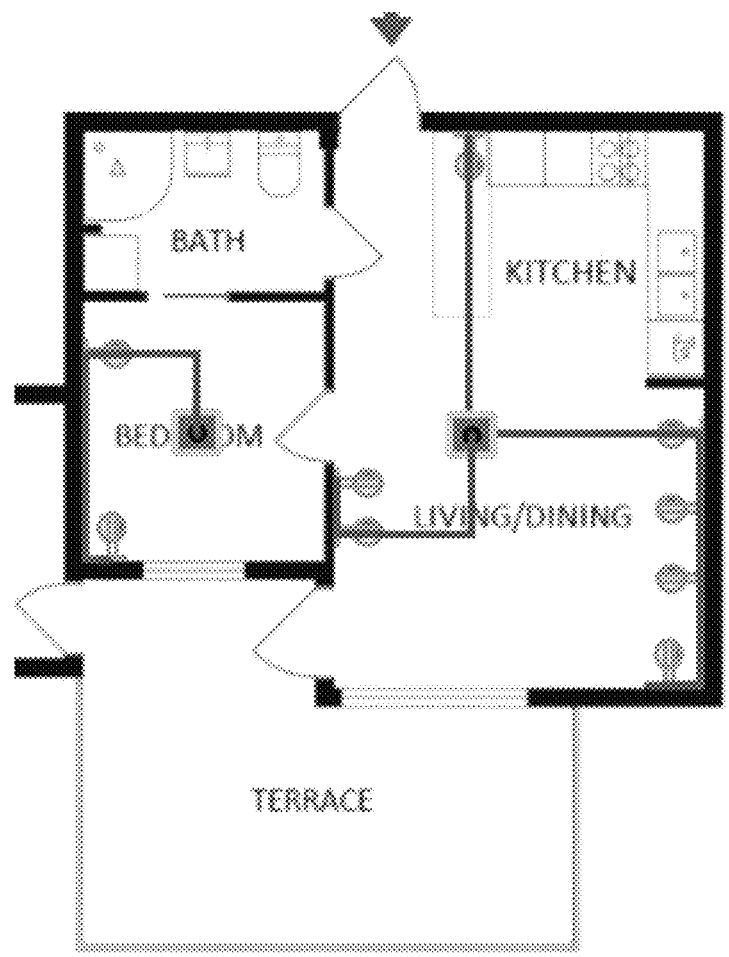
FIG. 9 illustrates an example of a connection method.
Figure 10:
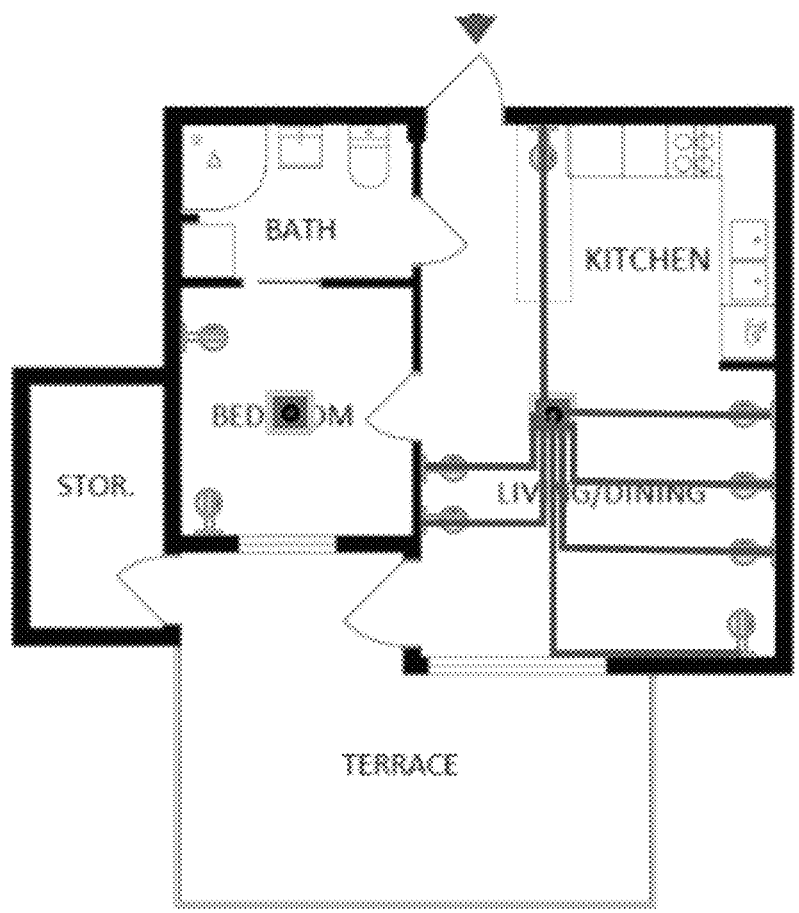
FIG. 10 illustrates an example of an alternative connection method.

At step 360, connection of assemblies may occur manually or automatically. As various assemblies may depend on interconnection in a structure to operate properly, a user may be presented with different methods to connect two or more assemblies. For example, a user may select a connection method that minimizes the usage of conduit or may select a spider approach where all connections are centralized on one assembly. Examples of this are shown in FIGS. 9-10. Alternatively, a user may choose which elements to interconnect and select locations for such interconnections.

At step 370, BOM generation may occur. Based on information within the project package, which may include scopeboxes, assemblies, and placement of assemblies, a Bill of Materials may be generated. For example, a Bill of Materials may contain for each item a name of the item, a location of an item, a unit of measure, a quantity, a symbol, industry-specific identifiers, manufacturers or retailers of items, etc.

In association with a Bill of Materials, a Schedule may also be generated. A Schedule may contain information with respect to each material specifying when it will be ordered, from whom it will be ordered, the time required for construction, the time required for fulfillment, the time required for shipping, the location for delivery, the timing and location for one or more staging areas (e.g., general receiving, second floor staging area), justification and time to resolution of any delay, labor requirements (e.g., number of staff required and type, labor pricing, employee schedules), and so on. In addition, the Schedule may receive or send information to third-party servers.

For example, if a project requires external component construction, such as pieces of concrete culvert pipes to be delivered, the system described herein may interact with the contractor's server to obtain information about progress toward completion or delivery. Alternatively, the system may prompt the contractor to access a web portal to provide updates to the Schedule as necessary. For example, a contractor may receive an email stating the need to update status on an order, such as the progress toward fulfilment of the order, any delays in the completion of the order, verification of the shipment of the order (e.g., by providing tracking information), authorization to fulfill the order (e.g., proof of compliance with legal and insurance requirements), etc.

In various embodiments, the system may track the location of BOM items on-site and determine their appropriate staging area with respect to the Schedule. For example, items needed sooner in the Schedule may result in instructions being included in the Schedule to relocate those items in staging areas closer to the work sites. The system may also identify potential shortages in the schedule and recommend re-ordering or substitutes if re-ordering is not available based on a database within the system of similar components. In some embodiments, the system may suggest alternative connection methods that may reduce shortages, such as switching from one placement of assemblies to another or by adjusting the interconnection of assemblies.

Figure 4:
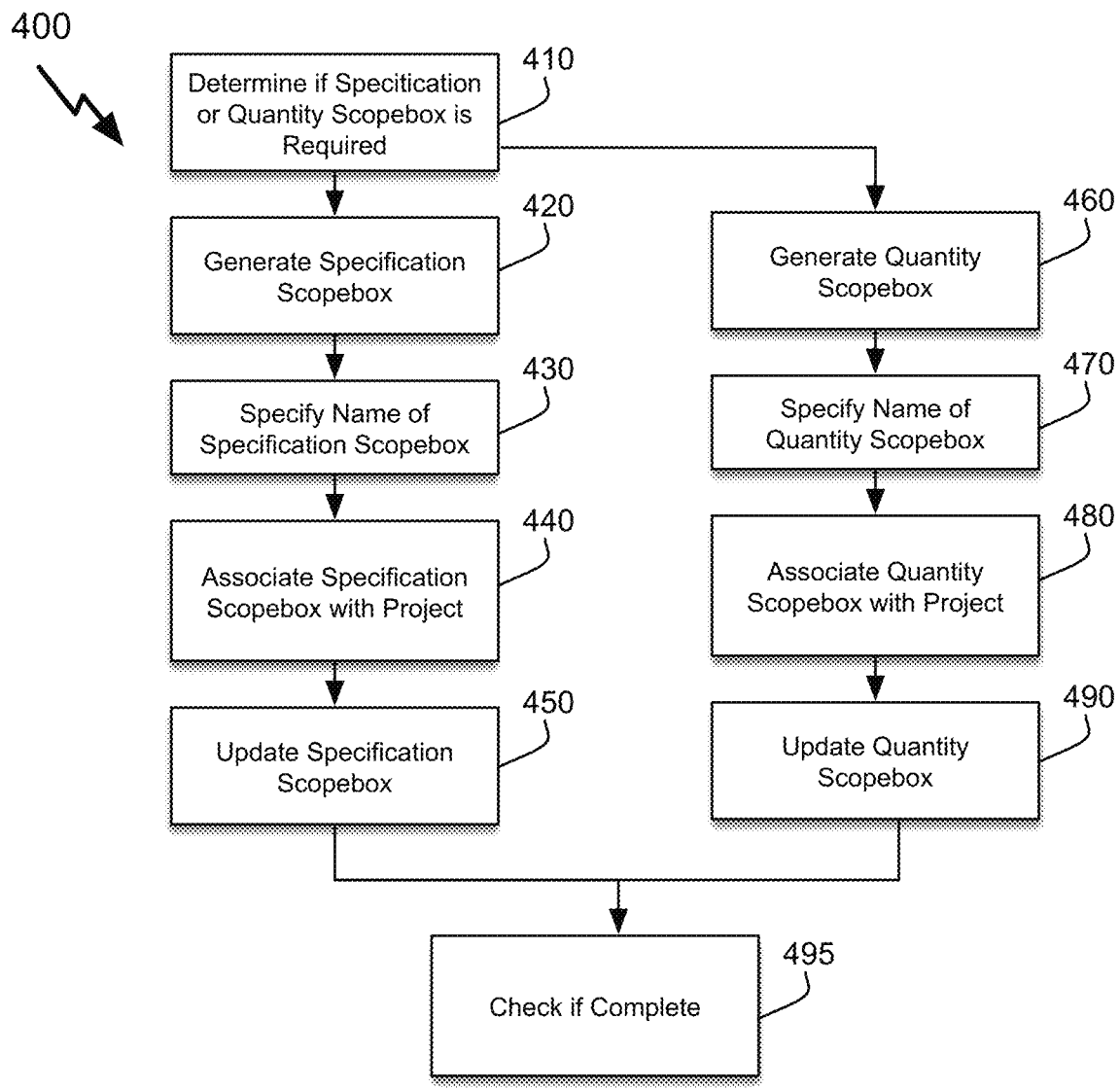
FIG. 4 illustrates an example of a method for scopebox generation.

With respect to FIG. 4, a method 400 for enabling Scopeboxes is shown. At step 410, a decision regarding whether to create a Specification Scopebox or a Quantity Scopebox may be made. If a Specification Scopebox is selected in step 410, then at step 420, a Specification Scopebox may generated by tools provided by the system. A Specification Scopebox, may contain a name, tags, number and location of assemblies, components, and materials, and any other project metadata so as to act as a template of a physical space. For example, a Specification Scopebox for a hospital room may specify the location and number of items necessary for the layout of structure, lighting and other electrical, mechanical elements, furniture, and other assemblies, components, and materials necessary to complete the room. In addition, Specification Scopeboxes may be embedded within each other. For instance, the hospital room Specification Scopebox may also have sub-Specification Scopeboxes associated with structure, lighting and other electrical, mechanical elements, furniture, and other assemblies, components, and materials (e.g., lighting Specification Scopebox). In this manner, Scopeboxes may be easily reused as a template throughout the drawings or models of the project package.

At step 430, a name may be provided or automatically generated for the Specification Scopebox. For example, the system may automatically specify the name of the Specification Scopebox by floor number and room number. In addition, if the Specification Scopebox is embedded within another Specification Scopebox, it may incorporate elements of the name of that Specification Scopebox in which it is embedded in its own name. For example, a Specification Scopebox embedded in the "Critical Care" Specification Scopebox located in ICU Room 2 may be specified as "Critical Care—ICU Room 2."

At step 440, the Specification Scopebox may be associated with a project. In some embodiments, Specification Scopeboxes may represent templates that are reusable between projects, such that they are stored in a general library. If a user then selects these general Specification Scopeboxes for use in their own project, then new Specification Scopeboxes may be copied over and assigned to the Project. Alternatively, a Specification Scopebox may be associated with a project when it is created within a project.

In some embodiments, the Specification Scopebox may also be associated with a client ID. For example, a Client ID may be used to create user-specific general libraries across multiple projects associated with a user or may be specific to a particular user or project. In some embodiments, the Client ID may be associated with a supplier of the physical manifestation of what the Specification Scopebox represents, thereby allowing the supplier to alter the Specification Scopebox as desired or necessary. In such embodiments where a project utilizes Specification Scopeboxes that are not associated with the user's Client ID, any changes to such Specification Scopeboxes may result in a notification to the user of such changes. The user may then accept the changes or refuse the changes. If changes are refused, the system may then reassign the Specification Scopebox to the user's Client ID and also perform any adjustments necessary to the Specification Scopebox relating to that reassignment. For example, if the original Specification Scopebox indicates that the items are supplied as a complete unit by a supplier, the reassigned Specification Scopebox may instead break down those items into individual elements that need to be ordered and scheduled separately within the user's project.

At step 450, all necessary data may be read and stored in the Specification Scopebox. For example, where a Specification Scopebox is embedded within another Specification Scopebox, information may be copied over to the new Specification Scopebox. In addition, the system may provide a template of different default Specification Scopeboxes, each of which when selected may prompt a default set of values when being added to a project.

If a Quantity Scopebox is selected in step 410, then at step 460 a Quantity Scopebox may be generated by tools provided by the system. A Quantity Scopebox may contain a name, tags, number of assemblies, components, and materials, and any other project metadata so as to act as a list of required elements. For example, a Quantity Scopebox for a second floor may be the number and type of items necessary for all structural, mechanical, and electrical elements on the second floor. The system may as necessary update such a Quantity Scopebox, based on any Specification Scopeboxes within a defined area.

In addition, Quantity Scopebox may be embedded within each other. For instance, a Second Floor Quantity Scopebox may also have sub-Quantity Scopeboxes associated with structure, lighting and other electrical, mechanical elements, furniture, and other assemblies, components, and materials (e.g., lighting Quantity Scopebox). In this manner, Quantity Scopeboxes may be easily reused to track the expected number of assemblies, components, and materials within various areas of the project workspace as Specification Scopeboxes are adjusted.

At step 470, a name may be provided or automatically generated for the Quantity Scopebox. For example, the system may automatically specify the name of the Quantity Scopebox by floor number and room number. In addition, if the Quantity Scopebox is embedded within another Quantity Scopebox, it may incorporate elements of the name of that Quantity Scopebox in which it is embedded into its own name. For example, a Quantity Scopebox embedded in the "Second Floor" Quantity Scopebox for room 13 may be specified as "Second Floor—Room 13."

At step 480, the Quantity Scopebox may be associated with a project. In some embodiments, Quantity Scopeboxes may represent templates that are reusable between projects, such that they are stored in a general library. If a user then selects these general Quantity Scopeboxes for use in their own project, then new Quantity Scopeboxes may be copied over and assigned to the Project. Alternatively, a Quantity Scopebox may be associated with a project when it is created within a project.

In some embodiments, the Quantity Scopebox may also be associated with a client ID. For example, a Client ID may be used to create user-specific general libraries across multiple projects associated with a user or may be specific to a particular user or project. In some embodiments, the Client ID may be associated with a supplier of a list of materials that the Quantity Scopebox represents, thereby allowing the supplier to alter the Quantity Scopebox as desired or necessary. In such embodiments where a project utilizes Quantity Scopeboxes that are not associated with the user's Client ID, any changes to such Quantity Scopeboxes may result in a notification to the user of such changes. The user may then accept the changes or refuse the changes. If changes are refused, the system may then reassign the Quantity Scopebox to the user's Client ID and also perform any adjustments necessary to the Quantity Scopebox relating to that reassignment. For example, if the original Quantity Scopebox indicates that the items are supplied as a complete set by a supplier, the reassigned Quantity Scopebox may instead break down those items into individual elements that need to be ordered and scheduled separately within the user's project.

At step 450, all necessary data may be read and stored in the Quantity Scopebox. For example, where a Quantity Scopebox is embedded within another Quantity Scopebox, information may be copied over to the new Quantity Scopebox. In addition, the system may provide a template of different default Quantity Scopeboxes, each of which when selected may prompt a default set of values when being added to a project.

At step 495, if no more Scopeboxes are required, the method may cease. Alternatively, if more Scopeboxes are required the method may return to step 410.

Figure 5:
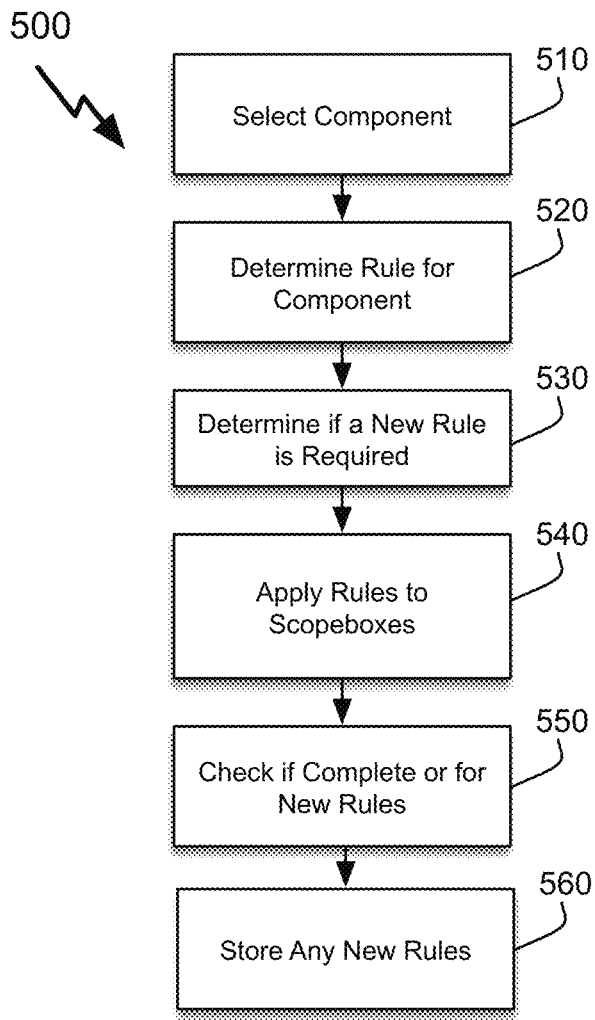
FIG. 5 illustrates an example of a method for enabling rules for material selection.

With respect to FIG. 5, a method 500 for a Rule Engine is shown for enabling rules for material selection. At step 510, a component may be selected. For example, a user or the system may select electrical conduit elements. At step 520, rules may be retrieved for the component, such as default rules for the component. For example, the system may specify a default type of conduit to be used for the conduit elements. In some embodiments, a user may modify the default rules for the component. For example, the user may prefer that a different type of conduit be used for such conduit elements.

At step 530, a decision may be made to determine a new role. For example, if a project adds a new type of material, then a new rule may be added to determine the specifications of the material as above. If no new rules are required, then at step 540 a user may be prompted to select one or more Specification Scopeboxes where the rules may be applicable. For example, the user may prefer to use default material specifications for Specification Scopeboxes in a lobby, but require different material specifications for use in a different area that requires different material types.

At Step 550, the method may then prompt a user for confirmation of the rules and apply said rules to the one or more Specification Scopeboxes if confirmation is received. Alternatively, at step 550, if a new rule is required then a new rule may be created. Further, the rule may be associated with a Client ID. If new rules have been received, then the method may return to step 540 to apply the new rules as above. At step 560, if no further new rules are required, the rules may then be stored in general or in association with one or more Scopeboxes, client IDs, projects, and so forth.

By the application of the rules in Method 500, virtual representations of physical materials in Specification Scopeboxes or Quantity Scopeboxes may be assigned physical values corresponding to their physical reality. For example, where a Specification Scopebox shows the location and number of conduits in a specific area, such rules may allow the user to easily switch the type of conduit from rigid metal conduit to electrical non-metallic tubing. Once this occurs, the system may then appropriately update any associated Quantity Scopeboxes to reflect the new number of rigid metal conduit and electrical non-metallic tubing components required.

Figure 11:
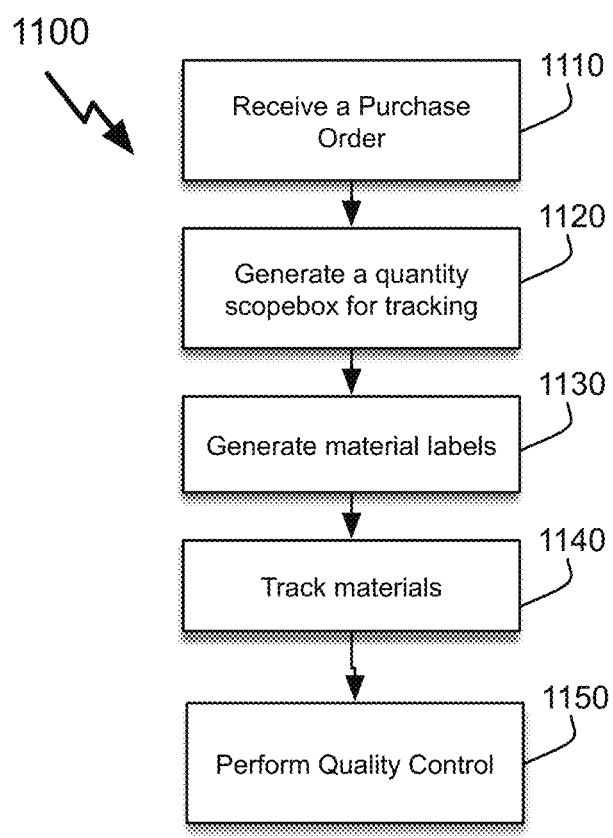
FIG. 11 illustrates an example of a method for tracking orders and deliveries.

With respect to FIG. 11, a method 1100 for tracking orders and deliveries is shown in accordance with a Schedule and BOM. At step 1110, a purchase order is received relating to items in a BOM. For example, the purchase order may specify the fixture type, quantity, color, and other relevant characteristics. In some embodiments, the purchase order may require processing into an acceptable format for the systems and methods described herein. For example, a purchase order received as a fax or email may be processed to conform with the requirements of the systems and methods herein. If this occurs, a user may be requested to review such a conversion or to correct any deficiencies resulting from the processing. In addition, as part of this process the purchase order may be verified against the BOM to ensure that only materials meeting the BOM are listed. If a violation of the BOM specifications is found, a user may be notified of the issue or a rejection of the purchase order may occur. If a purchase order is rejected, a notification may be included in the rejection specifying the nature of the rejection, such as that certain items fail to meet the certain criteria as specified by the BOM.

At step 1120, the materials listed in the purchase order along with their characteristics may then be placed in a quantity scopebox for tracking purposes. The quantity scopebox may include a creation date, such as based on the purchase order, and also include information relative to other scopeboxes (e.g., the specification scopebox(es) where the materials correspond to).

At step 1130, material labels may be generated. In some instances, the labels may contain QR codes, bar codes, or other identifiers. Labels may be generated for the shipment as a whole, groupings of elements of the shipment, or individual elements of the shipment. These may then be printed and delivered to the appropriate area awaiting delivery of the purchase order. Once the purchase order arrives, whether in part or as a whole, the labels may be applied to aid in tracking of the materials. Alternatively, the labels may be delivered to a supplier either electronically or physically for attachment as described above. In some embodiments, the label may be applied to a component by etching, ink, or other processes during its manufacture.

At step 1140, tracking may occur to determine whether the package as a whole or in part has been shipped or delivered. For example, a shipper may scan a bar code or QR code and send that information along with location information (e.g., GPS) that is then recorded with a date and time for tracking purposes. In addition, users may also scan the labels to indicate the installation of an item, to report a defect and request a replacement via the system, to determine if the item needs to be relocated, and so forth.

At step 1150, quality control testing may be implemented by randomly selecting components prior to installation. For example, the system may automatically determine a group of elements within the quantity scopebox that require testing, such as by random selection. In such an embodiment, a user via an app or website connected to the system may then locate the item according to its label and associated information (e.g., location) provided by the system, conduct testing as specified by the system, and then record the results of the testing in the system. By this manner, the system may seek to ensure that items meet specifications and are without defects. In some embodiments, if an item does not meet specifications or is defective, the system may automatically require additional testing, notify a user, reject the purchase order, or order replacements.

As another example, completion of a construction project may require documentation that the materials are properly installed. Accordingly, the system may identify procedures based on materials when installed to be performed by a user upon the completion of installation (e.g., check that the lights works) that indicate that the installation of the materials meets requirements. In addition, the system may specify that one or more photos or videos be taken of the installation, such that their physical location can be determined relative to other items in a specification scopebox. Once this occurs, the system may then evaluate whether the physical location of the material is consistent with its virtual location in the specification scopebox. If this is not the case, the system may flag the installation and material as unsuccessful or requiring further review. In some embodiments, a failed installation may result in adjustments in a schedule where an estimate of the time required to remedy the situation can be made automatically by the system or is entered by a user. In addition, where a remedy cannot reuse materials consumed in the installation, the system may automatically relocate or order materials for the remedy.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical discs, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A system for generating a bill of materials and a schedule, the system comprising:
   one or more processors; and
   one or more non-transitory computer-readable memories coupled to the one or more processors and configured with instructions that are executable by the one or more processors to cause the system to perform operations, the operations including:
   receiving a file, folder, or package;
   generating one or more virtual 2D or 3D models and a relational database based on the file, folder, or package;
   generating one or more specification scopeboxes, wherein the one or more specification scopeboxes are defined by spaces within the one or more virtual 2D or 3D models;

determining placement of a set of assemblies,
  wherein the set of assemblies includes virtual parametric representations of light fixtures, electrical circuit boxes, sprinklers, doors, cabinets, mechanical systems, security systems, and communication/data systems,
  wherein the placement of an assembly within a space defined by a specification scopebox of the one or more specification scopeboxes causes the assembly to be associated with the specification scopebox,
  wherein determining the placement of the set assemblies includes:
    presenting via a graphical user interface, a library of a number of different assemblies;
    receiving, via the graphical user interface, a user selection of a user-selected assembly from the number of different assemblies; and
    placing the user-selected assembly on or within the one or more virtual 2D or 3D models based on a user input, via the graphical user interface, relative to the one or more virtual 2D or 3D models, and
  wherein each assembly of the set of assemblies has an assembly scopebox and determining the placement of the set assemblies further includes receiving, via the graphical user interface, user edits to an assembly scopebox associated with the user-selected assembly;
determining one or more interconnections of the set of assemblies;
generating at least one quantity scopebox containing materials necessary for placement of the set of assemblies and the one or more interconnections of the set of assemblies by:
  applying rules to virtual representations of the set of assemblies and the one or more interconnections of the set of assemblies to assign values of physical materials to the set of assemblies and the one or more interconnections of the set of assemblies,
    wherein the applying the rules includes:
      selecting a first component of the set of assemblies and the one or more interconnections of the set of assemblies;
      obtaining a first rule for the first component;
      receiving, via the graphical user interface, a user confirmation of the first rule for the first component; and
      in response to receiving the user confirmation, applying the first rule for the first component, wherein the first rule is a default rule or a user-defined rule for a type of component corresponding to the first component; and
generating a schedule for ordering or placement of the materials.

2. The system of claim 1, wherein the instructions include a material tracking software component configured to track a quantity and location of materials at construction stages or locations, a progress of fabrication of materials to field installation, or a combination thereof.

3. The system of claim 1, wherein the instructions include a health check software component configured to:
  perform one or more checks including one or more checks selected from the group consisting of checking conduit runs that do not terminate at a junction, checking junctions not connected to a conduit, and checking whether a layout violates design constraints;
  perform simulations to determine energy efficiency, air quality, and environmental measurements; and
  track pricing information of materials and recommend possible substitutions that may generate a cost savings.

4. The system of claim 1, wherein the instructions include a prefabbed assemblies software component configured to receive, generate, and store prefabricated assemblies for a layout of plumbing, lighting, and electrical with respect to each predefined room layout, wherein the prefabricated assemblies refer to designs that are repeated throughout a parametric structure.

5. The system of claim 1, wherein the first rule is the default rule.

6. The system of claim 1, wherein the first rule is the user-defined rule for the type of component corresponding to the first component.

7. The system of claim 1, wherein the assembly scopebox includes data indicating name, position, layer, height, work package, level, area, and parts assignments.

8. The system of claim 1, wherein determining the one or more interconnections of the set of assemblies includes:
  presenting, via the graphical user interface, a first interconnection method and a second interconnection method;
  receiving, via the graphical user interface, a user selection selecting a first of the first interconnection method or the second interconnection method; and
  automatically virtually connecting two or more assemblies of the set of assemblies in accordance with the first of the first interconnection method or the second interconnection method.

9. The system of claim 8, wherein the first interconnection method determines connections to minimize usage of conduit.

10. The system of claim 8, wherein the second interconnection method is a spider approach to connecting the two or more assemblies.

11. The system of claim 8, wherein determining the one or more interconnections of the set of assemblies further includes:
  receiving, via the graphical user interface, user selections of assemblies to interconnect;
  receiving, via the graphical user interface, user selections of locations for interconnections between the user selected assemblies; and
  virtually connecting and mapping the user selected assemblies and the interconnections between the user selected assemblies.

12. The system of claim 1, wherein each assembly of the set of assemblies includes one or more tags and at least one layer setting.

13. The system of claim 12, wherein the at least one layer setting is prompted, via the graphical user interface, from a user when an assembly is placed.

14. The system of claim 13, wherein the at least one layer setting includes a layer name, layer abbreviations associated with the layer name, and colors associated with layer name.

15. The system of claim 1, wherein generating the one or more specification scopeboxes includes:
  presenting, via the graphical user interface, the one or more virtual 2D or 3D models;
  receiving, via the graphical user interface, a user selection of a space of the one or more virtual 2D or 3D models defining boundaries of the space; and
  generating a specification scopebox based on the user selection.

16. The system of claim 15, wherein receiving the user selection of the space includes:

receiving, via the graphical user interface, user-input indicating a list of coordinates forming the space;
using a selection tool that draws a volumetric area for the space based on pre-defined shapes; or
a combination thereof.

17. The system of claim 1, wherein the schedule indicates a receiving order of arrival of the set of assemblies, one or more storage locations for the set of assemblies over time, and an installation order for the set of assemblies.

18. The system of claim 17, further comprising:
receiving a first data indicating a delivery of a subset of the set of assemblies, wherein the first data includes scan data for a QR code or barcode for each assembly, location data of the scan, and a timestamp,
wherein the QR code or barcode indicates the assembly by name or identification;
determining, based on progress within the schedule, a location for the subset of the set of assemblies;
presenting, to a user, the location for the subset of the set of assemblies; and
after an assembly of the subset of the set of assemblies is installed, receiving second data including one or combinations of: installation data, quality check data, damage data, and images of the assembly as installed.

19. A computer-implemented method, comprising:
receiving a file, folder, or package;
generating one or more virtual 2D or 3D models and a relational database based on the file, folder, or package;
generating one or more specification scopeboxes, wherein the one or more specification scopeboxes are defined by spaces within the one or more virtual 2D or 3D models;
determining placement of a set of assemblies,
wherein the set of assemblies includes virtual parametric representations of light fixtures, electrical circuit boxes, sprinklers, doors, cabinets, mechanical systems, security systems, and communication/data systems,
wherein the placement of an assembly within a space defined by a specification scopebox of the one or more specification scopeboxes causes the assembly to be associated with the specification scopebox,
wherein determining the placement of the set of assemblies includes:
presenting, via a graphical user interface, a library of a number of different assemblies;
receiving, via the graphical user interface, a user selection of a user-selected assembly from the number of different assemblies; and
placing the user-selected assembly on or within the one or more virtual 2D or 3D models based on a user input, via the graphical user interface, relative to the one or more virtual 2D or 3D models, and
wherein each assembly of the set of assemblies has an assembly scopebox and determining the placement of the set of assemblies further includes receiving, via the graphical user interface, user edits to an assembly scopebox associated with the user-selected assembly;
determining one or more interconnections of the set of assemblies;
generating at least one quantity scopebox containing materials necessary for placement of the set of assemblies and the one or more interconnections of the set of assemblies; and
generating a schedule for ordering or placement of the materials.

20. A non-transitory computer readable memory storing instructions, that when exercised by at least one processor, cause the at least one processor to perform operations, the operations comprising:
receiving a file, folder, or package;
generating one or more virtual 2D or 3D models and a relational database based on the file, folder, or package;
generating one or more specification scopeboxes, wherein the one or more specification scopeboxes are defined by spaces within the one or more virtual 2D or 3D models;
determining placement of a set of assemblies,
wherein the set of assemblies includes virtual parametric representations of light fixtures, electrical circuit boxes, sprinklers, doors, cabinets, mechanical systems, security systems, and communication/data systems,
wherein the placement of an assembly within a space defined by a specification scopebox of the one or more specification scopeboxes causes the assembly to be associated with the specification scopebox,
wherein determining the placement of the set of assemblies includes:
presenting, via a graphical user interface, a library of a number of different assemblies;
receiving, via the graphical user interface, a user selection of a user-selected assembly from the number of different assemblies; and
placing the user-selected assembly on or within the one or more virtual 2D or 3D models based on a user input, via the graphical user interface, relative to the one or more virtual 2D or 3D models, and
wherein each assembly of the set of assemblies has an assembly scopebox and determining the placement of the set of assemblies further includes receiving, via the graphical user interface, user edits to an assembly scopebox associated with the user-selected assembly;
determining one or more interconnections of the set of assemblies;
generating at least one quantity scopebox containing materials necessary for placement of the set of assemblies and the one or more interconnections of the set of assemblies; and
generating a schedule for ordering or placement of the materials.

* * * * *